(12) United States Patent
Castro et al.

(10) Patent No.: US 7,326,005 B1
(45) Date of Patent: Feb. 5, 2008

(54) AIR POWERED STORAGE DEVICE FOR PNEUMATIC TRANSPORT SYSTEM

(75) Inventors: Raymond Anthony Castro, Denver, CO (US); Jim Podracky, Denver, CO (US); Robert Trenconsky, Elizabeth, CO (US)

(73) Assignee: Translogic Corporation, Denver, CO (US)

( * ) Notice: Subject to any disclaimer, the term of this patent is extended or adjusted under 35 U.S.C. 154(b) by 0 days.

(21) Appl. No.: 11/334,154

(22) Filed: Jan. 17, 2006

Related U.S. Application Data

(60) Provisional application No. 60/644,850, filed on Jan. 18, 2005.

(51) Int. Cl.
*B65G 51/22* (2006.01)
(52) U.S. Cl. ............ 406/192; 406/83; 406/19
(58) Field of Classification Search .......... 406/83, 406/192, 19
See application file for complete search history.

(56) References Cited

U.S. PATENT DOCUMENTS

| | | | | |
|---|---|---|---|---|
| 1,753,987 A * | 4/1930 | Hohne | .......... | 406/19 |
| 1,823,056 A * | 9/1931 | Marburg | .......... | 406/10 |
| 2,174,718 A * | 10/1939 | Drenkard, Jr. | .......... | 406/147 |
| 2,679,990 A * | 6/1954 | Mathzeit et al. | .......... | 406/4 |
| 2,709,555 A * | 5/1955 | Schroder | .......... | 406/192 |
| 3,148,845 A * | 9/1964 | Buchwald et al. | .......... | 406/19 |
| 3,265,325 A * | 8/1966 | Buchwald et al. | .......... | 406/19 |
| 3,408,113 A * | 10/1968 | Bouladon | .......... | 406/19 |
| 4,234,271 A * | 11/1980 | Kalina | .......... | 406/1 |
| 4,240,768 A * | 12/1980 | Carstens | .......... | 406/19 |
| 4,502,215 A * | 3/1985 | Davis et al. | .......... | 29/874 |
| 4,516,888 A * | 5/1985 | Kardinal | .......... | 406/182 |
| 4,971,481 A * | 11/1990 | Foreman | .......... | 406/15 |
| 6,024,208 A * | 2/2000 | Chooi et al. | .......... | 198/534 |
| 6,068,428 A * | 5/2000 | Nair et al. | .......... | 406/109 |
| 6,290,434 B1 * | 9/2001 | Celada-Gonzalez et al. | .......... | 406/197 |
| 6,659,693 B1 * | 12/2003 | Perkins et al. | .......... | 406/62 |
| 6,932,544 B2 * | 8/2005 | McMahon et al. | .......... | 406/197 |
| 6,939,088 B2 * | 9/2005 | Farrell | .......... | 406/192 |
| 7,104,734 B2 * | 9/2006 | Smith et al. | .......... | 406/117 |

* cited by examiner

*Primary Examiner*—Joe Dillon, Jr.
(74) *Attorney, Agent, or Firm*—Marsh Fischmann & Breyfogle LLP

(57) ABSTRACT

An air powered storage device is provided that is operative to temporarily store pneumatic carriers within a pneumatic carrier system. Generally, the device includes a pneumatic tube that is sized to permit the passage of pneumatic carriers. A gate member is selectively positionable into and out of an internal bore of the pneumatic tube to impede movement of pneumatic carriers there through. The device further includes a blower having a first fluid inlet disposed on a first side of the gate member and a fluid outlet disposed on a second side of the gate member. The fluid inlet and outlet are fluidly interconnected to the internal bore of the pneumatic tube such that the blower is selectively operable to generate a fluid flow through the internal bore between the fluid outlet and the fluid inlet. Such fluid flow may be utilized to reinitiate movement of a stopped carrier.

25 Claims, 8 Drawing Sheets

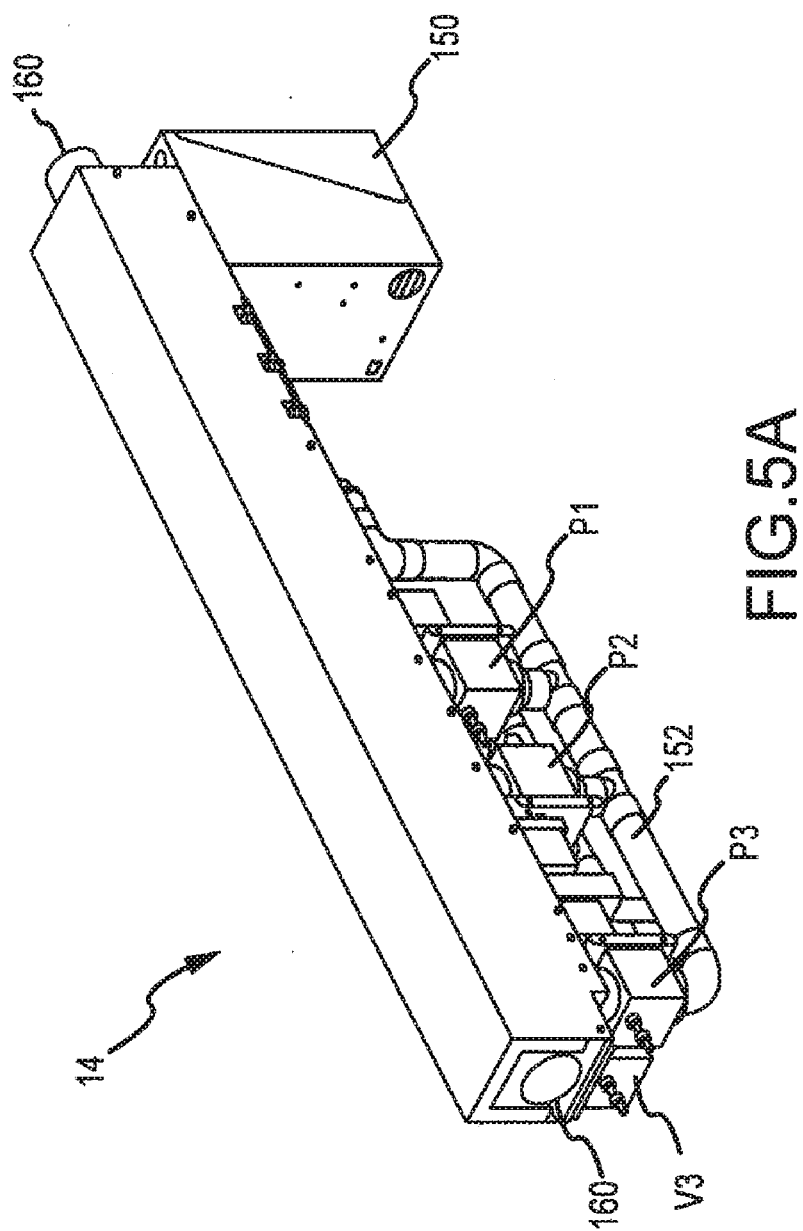

AIR POWERED STORAGE DEVICE FOR PNEUMATIC TRANSPORT SYSTEM

CROSS REFERENCE TO RELATED APPLICATION

This application claims priority under 35 U.S.C. §119 to U.S. Provisional Application No. 60/644,850 entitled "Air Powered Linear Storage Device" and which was filed on Jan. 18, 2005, the contents of which are incorporated herein by reference.

FIELD OF THE INVENTION

The present invention relates generally to the field of pneumatic tube carrier systems, and more particularly to a system and method for storing and handling multiple carriers at an intermediate location within in a pneumatic tube carrier system.

BACKGROUND OF THE INVENTION

Pneumatic tube carrier systems are a well-known means for the automated transport of materials between, for example, an origination location to any one of a plurality of destination locations. A typical system includes a number of pneumatic tubes interconnected in a network to transport carriers between a number of user stations. Various blowers and transfer units provide the force and path control means, respectively, for moving the carriers through and from tube-to-tube within the system. One type of transfer unit allows pneumatic carries to be moved from a first pneumatic tube to a second pneumatic tube in order to route the pneumatic carrier between locations, or stations, in the network.

The pneumatic tubes that connect the various locations may be arranged in any manner that allows the carriers to be transferred between various stations. Generally, an individual station is interconnected to the network by a single pneumatic tube. In this arrangement, such a single pneumatic tube is utilized to carry carriers to and from the station. Other portions of the network are often interconnected with dedicated pneumatic tubes. That is, two locations within the system may be interconnected by two dedicated pneumatic tubes where a first tube carries outgoing pneumatic carriers and a second tube (e.g., a parallel tube) carries incoming pneumatic carriers.

As will be appreciated, locations having a single pneumatic tube connection can only carry a pneumatic carrier in a single direction at a time. To avoid gridlock in the system, it is desirable to remove carrier from such single tube connections as soon as possible. For instance, when delivering a carrier to a station via a single tube connection, the station may be designed such that the carrier is removed from the tube immediately upon arrival (e.g., the carrier falls into a receiving bin). The tube may thus be cleared for additional transactions. However, a more difficult situation arises when a carrier is being sent from a single tube location. Depending upon network traffic, a route to an intended destination may not be immediately available. Further, if the carrier remains in a single tube awaiting launch, the carrier may interfere with incoming traffic.

Accordingly, it may be desirable to send an outgoing carrier to a location within the network where the carrier may be temporarily stored until the carrier can be processed and sent to its intended destination. However, stopping a carrier at such a location within a pneumatic network can lead to various complications. One particular complication is that the carrier, once stopped, may become stuck within a pneumatic tube within the network and thereby require manual removal. That is, it may be difficult to reinitiate movement of a stationary carrier within a pneumatic tube. Previous systems have attempted to utilize a conveyor belt system to reinitiate movement of stationary carriers. However, such systems have proved mechanically difficult to manufacture, pneumatically seal and maintain. Further, due to the constraints of operating a conveyor belt within a pneumatic tube, the contact area between such a conveyor belt and a pneumatic carrier is generally small and may fail to provide enough force to initiate movement of a stationary carrier thereby requiring manual intervention. In this regard, failure to reinitiate movement of a stationary carrier may require that a portion of the network or the entire network to be shut down for maintenance.

SUMMARY OF THE INVENTION

One objective of the present invention is to provide a means for temporarily storing one or more carriers within a pneumatic tube carrier system.

Another objective of the present invention is to provide a means for reliably reinitiating movement of a pneumatic carrier that has stopped in a pneumatic tube carrier system.

These and additional objective are achieved by the present invention where an air powered storage device, which is operative to at least temporarily stop and/or store pneumatic carriers within a pneumatic carrier system, utilizes an independent pressure system to selectively create a pressure differential across stationary carrier. The term independent pressure system as used herein is meant to denote a pressure system that is separate from pressure/vacuum created by the main blowers of a pneumatic carrier system (i.e., system blowers).

The pressure differential caused by the independent pressure system of the device is utilized for reinitiating movement of a stationary carrier. In this regard, the air powered device may create a pneumatic circuit within the pneumatic carrier system (e.g., a pneumatic circuit within a larger pneumatic circuit) for providing a pushing/pulling force to a stationary carrier. Such an independent pressure system may advantageously be utilized in linear storage devices that store one or more pneumatic carriers within a pneumatic tube within the pneumatic carrier system. However, such independent pressure systems may be incorporated into any portion of a pneumatic carrier system where it may be desirable to selectively provide an increased fluid flow between first and second points and/or provide an increased pressure differential across a stationary carrier.

According to a first aspect of the present invention, the device includes a pneumatic tube having an internal bore that is sized to permit the passage of a pneumatic carrier. A first gate member is selectively positionable into and out of the internal bore of the pneumatic tube. This gate member is operative to impede the movement of a pneumatic carrier through the internal bore. Stated otherwise, the first gate member is operative to stop a pneumatic carrier from passing through the pneumatic tube. The device further includes a blower having a first fluid inlet disposed on a first side of the first gate member and a fluid outlet disposed on a second side of the first gate member. The fluid inlet and outlet are fluidly interconnected to the internal bore of the pneumatic tube such that the blower is selectively operable to generate a fluid flow through the internal bore between the fluid outlet and the fluid inlet. Such fluid flow may be utilized to initiate movement of a stopped carrier.

Variations and refinements exist to the subject aspect of the invention. Such variations and refinements may exist in any combination. For instance, the blower may be selectively operable to provide varying fluid flows between the fluid outlet and the fluid inlet. In this regard, a pressure differential across a stationary carrier between the outlet and the inlet may be varied (e.g., increased) as necessary. That is, if an initial fluid flow is insufficient to reinitiate movement of the carrier, the fluid flow may be increased to provide an additional pressure differential across the carrier (e.g., an increased pushing force).

The gate member may be any element that is operative to move into and out of the internal bore of the pneumatic tube in order to at least partially engage a pneumatic carrier passing therethrough. That is, the gate member need only be operative to stop/prevent passage of a pneumatic carrier through the internal bore of the pneumatic tube. In one arrangement, the gate member is operative to be disposed into the internal bore while permitting a fluid flow through the internal bore. In another arrangement, the gate member prevents fluid flow through the internal bore when positioned within the internal bore of the pneumatic tube.

In one arrangement, the device further incorporates a second gate member that is selectively positionable into and out of the internal bore of the pneumatic tube. In this embodiment, a spacing between the first gate and the second gate may permit storage of a pneumatic carrier therebetween. In order to reinitiate movement of a pneumatic carrier stored between the first and second gates, additional fluid outlets and/or inlets may be incorporated into the device. In this regard, the second gate member, which may engage a first end of a pneumatic carrier, may be positioned out of the internal bore of the pneumatic tube and a fluid flow from the blower may be applied to a second end of that carrier. Accordingly, the carrier may be pushed beyond the second gate and into a subsequent portion of a pneumatic carrier system.

Each fluid inlet and/or fluid outlet interconnected to the blower may further include a selectively operable valve to permit selectively opening and closing a flow path between the inlet/outlet and the blower. For instance, when a plurality of fluid inlets and/or fluid outlets are fluidly connected to the internal bore of a pneumatic tube, various combinations of inlet valves and/or outlet valves may be opened to generate a desired pneumatic circuit through the internal bore of the pneumatic tube. In this regard, pressure differential may be created across a pneumatic carrier located at different locations within the device.

Generally, the fluid inlets and/or fluid outlets may extend through a side surface of the pneumatic tube to fluidly interconnect the blower to the internal bore of the pneumatic tube. As will be appreciated, ducting may extend between the fluid inlet and fluid outlet and the blower. In one arrangement, this ducting comprises a slip fit arrangement. In this regard, adjacent ducts utilize a friction fit that is free of mechanical fasteners therebetween. Such a slip fit duct arrangement may facilitate maintenance of the device.

According to another aspect of the present invention, a method for temporarily storing pneumatic carriers within a pneumatic carrier system is provided. The method includes moving a pneumatic carrier through an internal bore of a pneumatic tube and stopping a pneumatic carrier at a predetermined position within the pneumatic tube. Subsequent to stopping such a pneumatic carrier, a fluid flow is injected into the internal bore of the pneumatic tube at a location proximate to a first end of the pneumatic carrier to generate a pressure differential across the carrier. This pressure differential is operative to reinitiate movement of the pneumatic carrier.

To further facilitate the creation of a pressure differential across a stopped/stationary pneumatic carrier, the method may further include removing a fluid flow from the internal bore of a pneumatic tube at a second location that is proximate to a second end of the pneumatic carrier. This may create a pneumatic circuit where fluid flows from the blower through the outlet, through the internal bore of the pneumatic tube, through the inlet and back to the blower. Accordingly, fluid flowing around this pneumatic circuit may be applied across the stopped pneumatic carrier to create a pressure differential. Accordingly, this fluid flow may be utilized to reinitiate movement of the carrier. Furthermore, the flow volume may be varied through the pneumatic circuit if necessary to increase a pushing and/or pulling force utilized to initiate movement of the carrier.

The step of stopping may further include moving a stopper member into the internal bore of the pneumatic tube to impede movement of a pneumatic carrier therethrough. Furthermore, the method may include moving the stopper member out of the internal bore of the pneumatic tube prior to injecting a fluid flow into the pneumatic bore to reinitiate movement of the carrier.

According to another aspect of the present invention, a device for temporarily storing carriers within a pneumatic transport system is provided. The device includes a pneumatic tube having an internal bore sized to permit passage of a pneumatic carrier and a stopper selectively positioned both into and out of the internal bore of the pneumatic tube. The stopper is operative to engage a pneumatic carrier passing through the pneumatic tube to impede the movement of the carrier. The device further includes a blower having a fluid outlet extending through a side wall of the pneumatic tube location on a first side of the stopper. The blower is operative to selectively inject a fluid flow into the internal bore to initiate movement of the stopped carrier.

As will be appreciated, the device discussed above may be incorporated into existing pneumatic transport systems. In this regard, a first end of the pneumatic tube of the device may be interconnected to a first component within a pneumatic transport system and a second end of the pneumatic tube may be interconnected to a second component within a pneumatic transport system. Such a component may include, without limitations, other pneumatic tubes, transfer units, user stations, and/or MTOs. What is important is that an internal bore of the device is aligned with an internal bore of the first and/or second components to permit passage of the carrier therethrough.

According to another aspect of the invention, a booster blower is provided for creating a pneumatic circuit within a larger pneumatic circuit. In this regard, the booster blower may be interconnected to a pneumatic tube having an internal bore wherein the internal bore of the pneumatic tube is subject to system pressure from a system blower. The system blower may be operative to move a pneumatic carrier through the pneumatic tube. The booster blower is fluidly interconnected to the pneumatic tube at first and second spaced locations. In this regard, an outlet of the blower is vented into the internal bore of the pneumatic tube and an inlet of the blower is drawn from the internal bore of the pneumatic tube. When operated, the blower is operative to generate a fluid flow between the outlet and the inlet in addition to the system fluid flow through the pneumatic tube. In this regard, a pressure boost may be applied to a pneumatic carrier passing through the pneumatic tube between the outlet and the inlet. As will be appreciated, such a system may be utilized with an existing pneumatic tube carrier system, for instance, in locations that have previously had pneumatic carriers become stuck or otherwise stationary.

BRIEF DESCRIPTION OF THE DRAWINGS

FIG. 5A illustrates a perspective view of an air powered transfer carrier unit (TCU).

DETAILED DESCRIPTION

Figure 1:
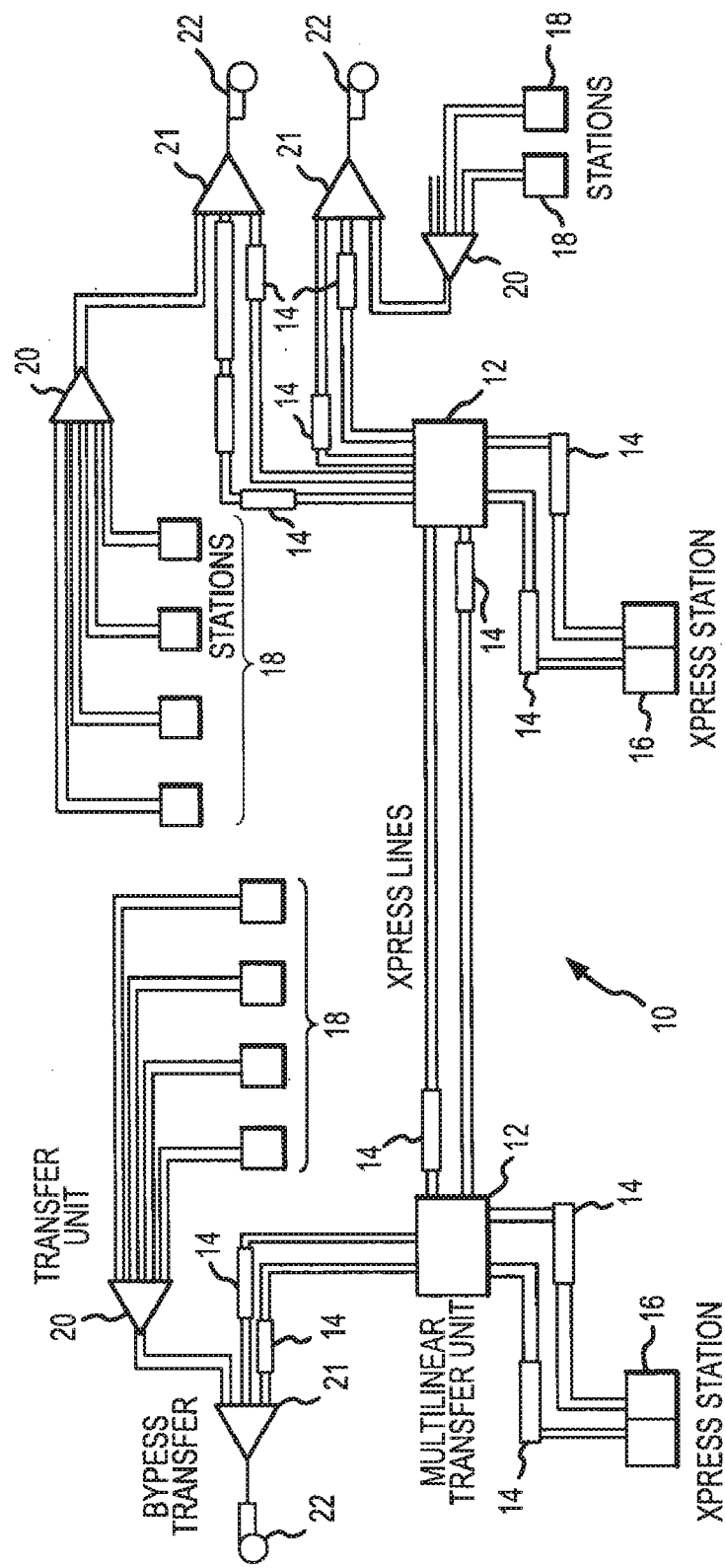
FIG. 1 illustrates a mechanical diagram for the pneumatic carrier system.

Disclosed in FIG. 1 is a system diagram for a pneumatic carrier system 10 within which the invention described herein is employable. In general, the pneumatic carrier system 10 transports pneumatic carriers between various user stations 16, 18, each such transport operation being referred to herein as a "transaction". At each of the user stations 16, 18, a user may insert a carrier, select/enter a destination address/identification and a transaction priority, and then send the carrier. The system determines an optimum path to route the carrier and begins directing the carrier through the system.

Interconnected with each station 16, 18 is a transfer unit 20 which orders carriers arriving through different tubes from a different station 16, 18 into a single pneumatic tube. This pneumatic tube is further in connection with a vacuum by-pass transfer unit 21 (i.e., a turn around transfer unit) and a blower 22 that provides the driving pneumatic force for carrier movement. A set of transfer units 20, 21, a blower 22 and one or more stations 16, 18 typically define a single zone. Generally, the blower 22 of each zone is operative to create pressure and/or vacuum (i.e., system pressure) within the pneumatic tube(s) of that zone. This pressure/vacuum is operative to create a pressure differential across a carrier disposed within the pneumatic tubes and causes the carrier to move through the pneumatic tubes. That is, the blower 22, transfer units and pneumatic tubes create a pneumatic circuit for use in transporting carriers between first and second points within the system 10. Multiple different zones may be interconnected (e.g., using a multi-linear transfer unit 12) to collectively define the pneumatic carrier system 10.

Within the system 10 itself, one or more devices are employable for ordering and routing carriers to their selected destinations. One type of device is a traffic control unit (TCU) 14 which is employable to receive, temporarily store and release a number of carriers. This functionality allows for launching a carrier from a user station 16, 18 prior to a path for a destination location being established. Likewise, this allows carrier tubes interconnecting the user station 16, 18 to be cleared for incoming traffic. As discussed herein, one or more TCUs 14 are provided within the system 10 that operate as linear storage devices, e.g., on a first in first out (FIFO) basis. However, it will be appreciated that certain aspects of the present invention are applicable to other configurations. For instance, certain aspects of the invention may be applied to a TCU that operates on a last in first out (LIFO) basis and/or a matrix style storage devices which store carriers in two-dimensional matrixes, wherein each carrier is separately storable, retrievable and releasable without movement of other carriers stored in the matrix.

Also included in the system 10 are multi-linear transfer units (MTUs) 12 which have functionality to direct carriers from one pneumatic tube to another pneumatic tube (e.g., between tubes in single zone or between different zones). For example, a MTU 12 may receive a carrier released by a TCU 14 in a first pneumatic tube and direct the carrier into a second pneumatic tube in the system 10 to complete a given transaction. The configuration of the TCUs 14 and MTUs 12 will be described in greater detail below.

Figure 2:
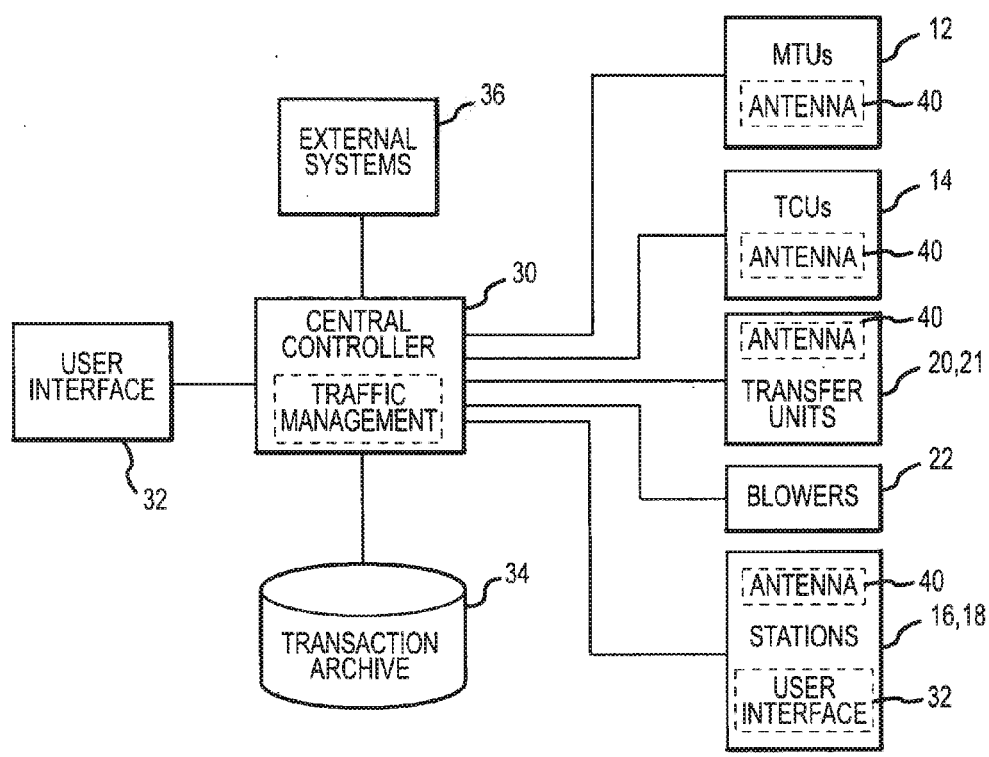
FIG. 2 illustrates a system diagram for the operation and monitoring of the pneumatic carrier system.
Figure 3:
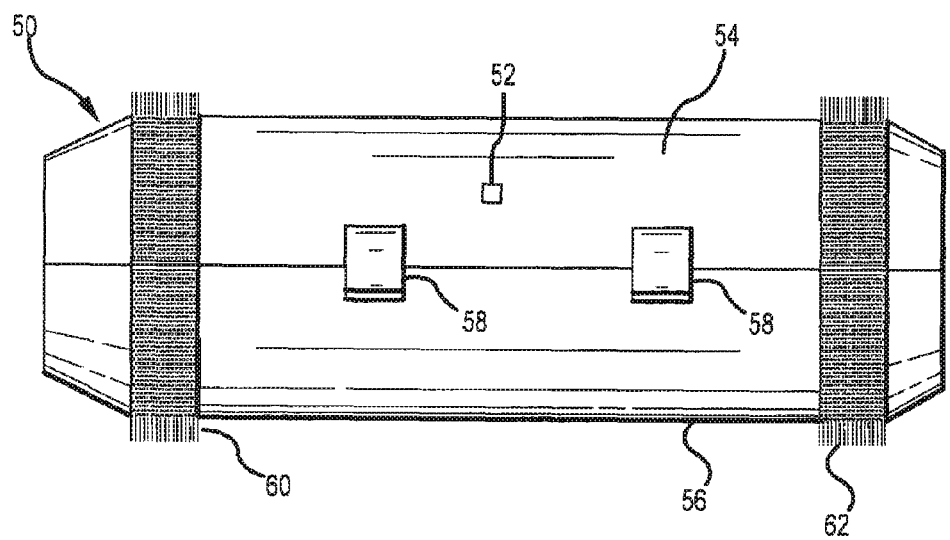
FIG. 3 illustrates a view of the pneumatic carrier including an identification chip.

All of the components described in FIG. 1 are electronically connected to a system central controller (SCC) 30 that controls their operation and which is disclosed in the electrical system diagram of FIG. 2. The system central controller (SCC) 30 provides centralized control for the entire pneumatic carrier system 10 and may include a digital processor and memory/achieve 34. In addition to controlling the operation of the carrier system 10 as depicted in FIG. 1, the SCC 30 may provide additional functionality. Such functionality may include, without limitation, interconnection to external systems 35 and/or use of multiple radio frequency identification (RFID) antennas 40 that may allow for identification of carriers within the system 10. In the latter regard, a system for RFID identification within a pneumatic carrier system is described in co-pending U.S. patent application Ser. No. 10/991,303 entitled "System and Method for Carrier Identification in a Pneumatic Carrier System" having a filing date of Nov. 17, 2004, the contents of which are incorporated by reference herein.

Connectable to the SCC 30 may be one or more user interfaces 32 through which a system user may monitor the operations of the system and/or manually enter one or more commands to control its operation. Typically, at least one user interface 32 is located at or within an area serviced by stations 16, 18. For example, in a medical facility application, one or more user stations 16, 18 and at least one user interface 32 may be provided within each emergency room, laboratory, nursing station, etc. In this regard, the user interface may be contained in the stations 16, 18, or be stand-alone units. Components 12, 14, 16, 18, 20, 21 and 22 shown in FIG. 2 are representations of the various electrical and electro-mechanical systems that may be employed by the pneumatic carrier system 10. Although in FIG. 2 they are represented single blocks, one skilled in the art will realize that the block for each type of device represents the electronics for a number of the same or similar type of components positioned throughout the system which provides for its operation.

One type of carrier 50 that may be utilized with the system 10 includes first and second shell members 54 and 56 that collectively define an enclosed space for use in carrying materials as they are transported through the system 10. These shell members 54, 56 are adjoinably cylindrical in cross-section for use in correspondingly cylindrical pneumatic tubes of the system 10. The shell members 54 and 56 may be pivotably interconnected by a hinge member (not shown), and latches 58 may be provided for securing the first shell member to the second shell member in a closed configuration. Also included as part of the carrier 50 are wear bands 60, 62. The wear bands 60, 62 are sized to snuggly fit within the inside surface of the pneumatic tubes in order to substantially block the passage of air across a carrier 50 within such a pneumatic tube. Accordingly, this blockage results in a pressure differential across the carrier 50 that results in the carrier 50 being pushed or drawn through the pneumatic tube.

In the embodiment shown, an ID chip 52 is attached to one of the shell members 54. Though shown as a single ID chip 52, it will be appreciated the additional ID chips may be utilized. IN any case, the ID chip 52 is configured to store and provide access to identification information written thereon when the carrier 50 is proximate to an antenna device. In this regard, antenna device/readers may be incorporated into pneumatic tubes within the system 10 as well as the system components such as 12, 14, 16, 18, 20, 21 and 22.

Figure 4:
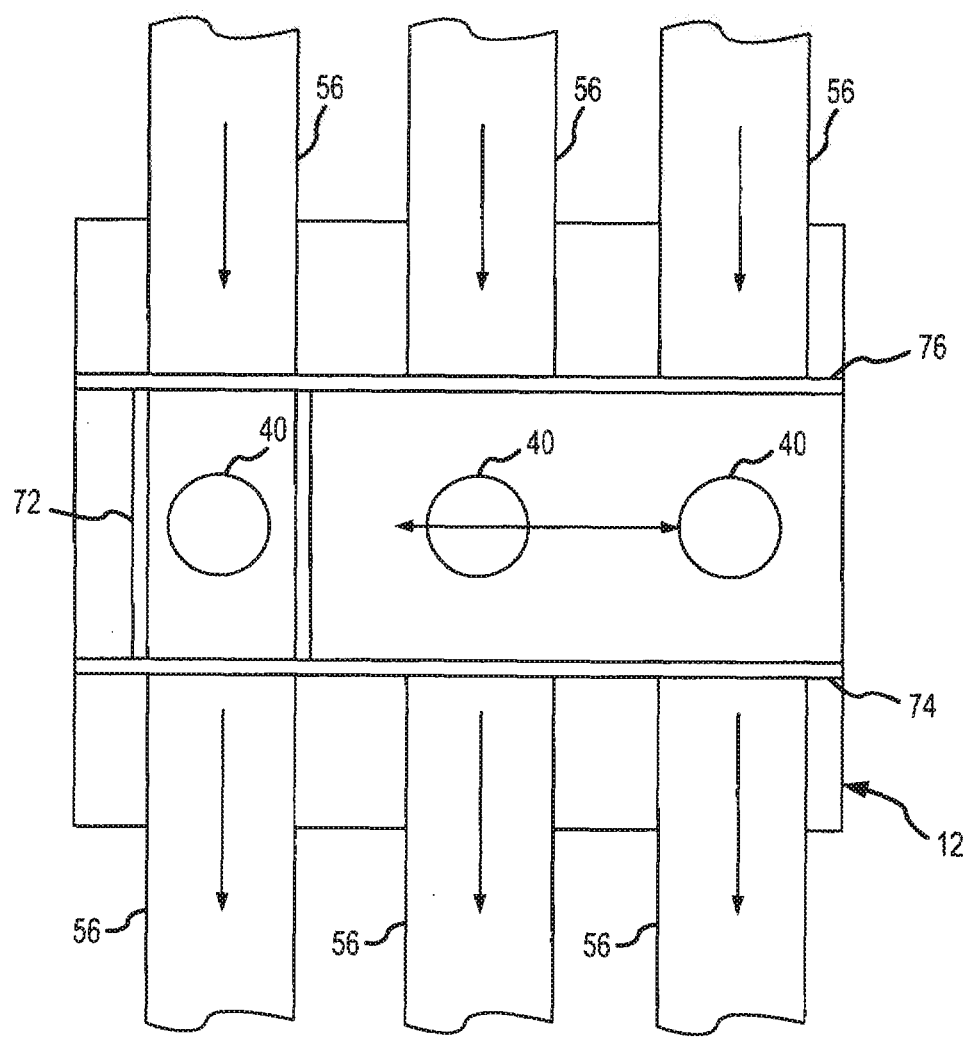
FIG. 4 illustrates a geometric view of a multi-linear transfer unit (MTU).

Disclosed in FIG. 4 is a breakaway view of an exemplary MTU 12 embodiment including an optional antenna/reader 40. As can be seen, the MTU 12 is interconnected with a number of incoming tubes 56 through which carriers are delivered to the MTU 12. Exiting from the MTU 12 are a number of exit tubes 56 which direct a carrier to a destination zone. Included in the MTU 12 is a carrier delivery device 72 (e.g., a bucket 72) which is moveable along guides 74 and 76 so as to receive carriers directed to the MTU 12 through pneumatic tubes 56 and then, in response to an instruction signal received from the SCC 30, if necessary, move the received carrier along the guides 74 and 76 to align the carrier with a selected exit pneumatic tube 56. Once a pneumatic vacuum force is applied to the selected exit tube 56, the bucket 72 releases the carrier.

Figure 5B:
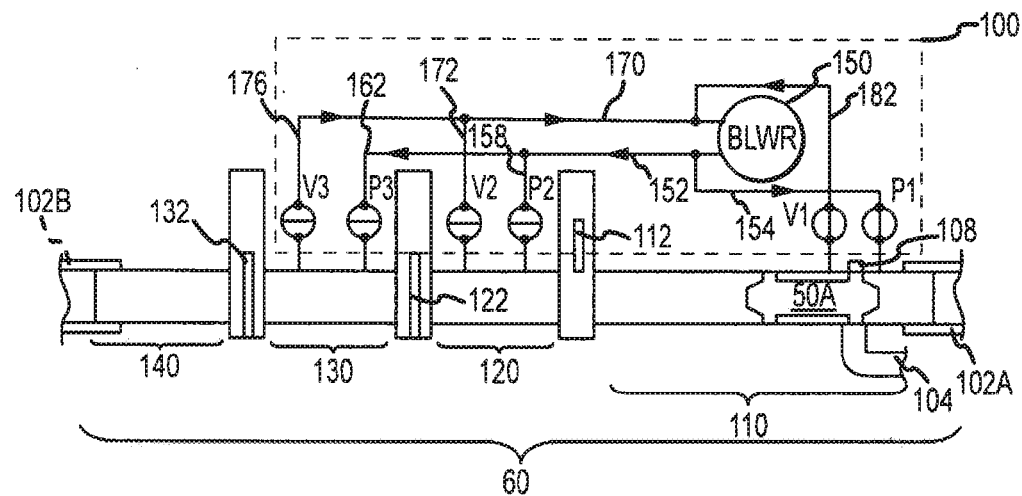
FIGS. 5B-F illustrate various schematic side views of a the TCU of FIG. 5A.

Disclosed in FIGS. 5A-5F show a perspective and schematic views of an exemplary air powered TCU 14 that is operative to temporarily store and release carriers within the system 10. As shown in FIG. 5B, the air powered TCU 14 is interconnected to an incoming pneumatic tube 102 within the system 10 through which the air powered TCU 14 receives pneumatic carriers 50. The air powered TCU 14 includes a storage zone 110 that is sized to receive and hold a number of carriers 50. The air powered TCU 14 may be disposed proximate to at least one transfer unit (e.g., MTU 12, by-pass transfer unit 21, transfer unit 20) having the functionality to direct a carrier from one pneumatic tube to another in order to route a carrier to a desired location within the system 10. In this regard, the air powered TCU 14 may hold a carrier (i.e., a second carrier) until a previously received carrier (i.e., a first carrier) is processed. Once the first carrier is processed (e.g., released to the transfer unit and/or directed into a destination locator) the second carrier may be released by the TCU 14 for processing.

As illustrated, the TCU 14 is a linear storage device that operates on a first in first out basis. As best shown in FIG. 5B, the TCU 14 includes three zones: a storage zone 110, a staging zone 120 and an output zone 130. These three zones 110, 120 and 130 and an output tube 140 collectively define a pneumatic tube 160 of the TCU 14 having an internal bore through which a carrier 50 may pass. The three separate zones 110, 120 and 130 are separated by three gates. Specifically, the storage zone 110 and staging zone 120 are separated by a gripper gate 112, the staging zone 120 the output zone 130 are separated by an entrance gate 122, and the output zone 130 is separated from an output tube 140 by an exit gate 132.

The air powered TCU 14 utilizes an independent pressure system 100 that is operative to selectively apply pressure and/or vacuum to a portion the pneumatic system to reinitiate movement of a stationary carrier that has been stopped within a pneumatic tube 102. More specifically, the independent pressure system 100 is operative to apply a pressure/vacuum across a stationary carrier 50 within the TCU 14 to reestablish motion of that carrier 50.

In the embodiment shown, the independent pressure system 100 includes a blower 150 that is interconnected to the zones 110, 120 and 130 of the TCU 14 to selectively apply pressure across one or more of those zones. Specifically, the blower 150 has an output line 152 and a return line 170. The output line 152 carries a pressurized output flow from the blower 150 and the return line carries air back to the blower 150. The output line 152 and input line 170 are interconnected to the internal bore of the pneumatic tube 160 of the TCU 14 at various locations. Though referred to as an independent system, the independent pressure system 100 is not fully isolated from system airflow. That is, the independent pressure system 100 is operative to create an airflow through various portions of the pneumatic tube 160, which may be in fluid communication with other pneumatic tubes (e.g. incoming tube 102). In effect, the independent pressure system 100 is operative to create a pressurized circuit within a larger pressurized circuit.

In the embodiment shown in FIGS. 5B-5E the output line 152 is utilized to selectively pressurize one or more zones 110, 120 and/or 130 of the of the TCU 14. In this regard, the output line 152 further includes a storage zone pressure line 154 that is interconnected to the arrival end of the storage zone 110 by a selectively operable storage zone pressurizing valve P1. As utilized herein the term arrival end refers to a direction from which the TCU 14 receives carriers (i.e., the right as shown in FIGS. 5B-5E) and the term output end refers to a direction to which the TCU 14 delivers carriers (i.e., the left as shown in FIGS. 5B-5E). Likewise, the arrival end of the staging zone 120 is interconnected to the output line 152 by staging zone pressure line 158 and a selectively operable staging zone pressure valve P2. Finally, the arrival end of the output zone 130 is interconnected to the output line 152 by output zone pressure line 162 and a selectively operable output zone pressure valve P3.

To allow selective pressurization across a) the storage zone 110 and staging zone 120; b) the staging zone 120, and/or c) the output zone 130, the output end of the staging zone 120 and output zone 130 are each interconnected to the blower input line 170. Specifically, the output end of the staging zone 120 is interconnected to the blower input line 170 utilizing staging zone return line 172 and a selectively operable staging zone return valve V2. Likewise, the output end of the output zone 130 is interconnected to the blower input line 170 by output zone return line 176 and a selectively operable output zone return valve V3. Finally, the independent pressure system 100 includes a valve V1 that allows the blower 150 to selectively draw air from a point on the incoming pneumatic tube 160 that is upstream of any carriers that may be in the storage zone 110 of the air powered TCU 14 through return line 182.

In one arrangement the blower 150 runs continually while the system 10 is in operation. Accordingly, at any time at least one pressurizing valve P1-P3 and at least one return valve V1-V3 should be open to allow for airflow through the blower 150. In a default state, valves V1 and P1 are open to maintain a fluid flow path through the blower 150.

As noted, the TCU 14 is operative to receive and temporarily store a plurality of carriers 50. In operation a carrier 50A may enter the storage zone 110 (i.e., from the right as shown by arrow in 5A) and proceed into the staging zone 120 if no other carriers are currently in the TCU 14. In this situation the gripper gate 112 may be in an open position (clear of a flow path through the TCU 14) to permit carriers to pass. The entrance gate 122 between the staging zone 120 and output zone 130 may be in a closed position (disposed in the flow path through the TCU 14) to prevent further advancement of the carrier 50. As will be appreciated, the carrier 50A is received from the incoming pneumatic tube 102 where it is under system pressure/vacuum. As shown, the system pressure is vented from or enters pneumatic tube 102 through exhaust port 104 disposed between valves P1 and V1 near the entrance of the air powered TCU 14. As the system pressure enters or is vented near the entrance of the TCU 14, little or no system pressure acts upon the carrier 50 within the TCU 14.

The carrier 50A may be traveling at a considerable speed (e.g., 25 ft/sec) upon entering the TCU 14. To prevent the carrier 50A from colliding with the closed entrance gate 122 (or the gripper gate 112 when closed), the TCU 14 is initially in the default state (i.e., P1 and V1 are open) where an air cushion is created within the storage zone 110, and in some instances storage zone 110 and staging zone 120. In the default state, the closed entrance gate 122 and closure of valves P2, P3, V2 and V3 substantially prevents airflow through the TCU 14, which results in a dead air zone. Once the carrier 50A passes the exhaust port 104, the air between the exhaust port 104 and the closed entrance gate 122 is compressed and thereby creates an air cushion within the storage zone 110 and/or staging zone 120. The air cushion is operative to reduce the velocity of the arriving carrier 50A and/or stop the carrier 50A prior to the carrier 50A impacting the entrance gate 122 and/or gripper gate 112.

As the carrier 50A passes the exhaust port 104, a sensor 108 identifies the presence of the carrier 50A. Once the presence of the carrier 50A is detected, valve V2 may be opened and valve V1 may be closed. See FIG. 5C. This creates an airflow through the storage zone 110 and staging zone 120. The airflow creates a pressure differential across the carrier 50A. That is operative to bias the carrier 50A forward until the carrier 50A abuts against the entrance gate 122.

Figure 5C:
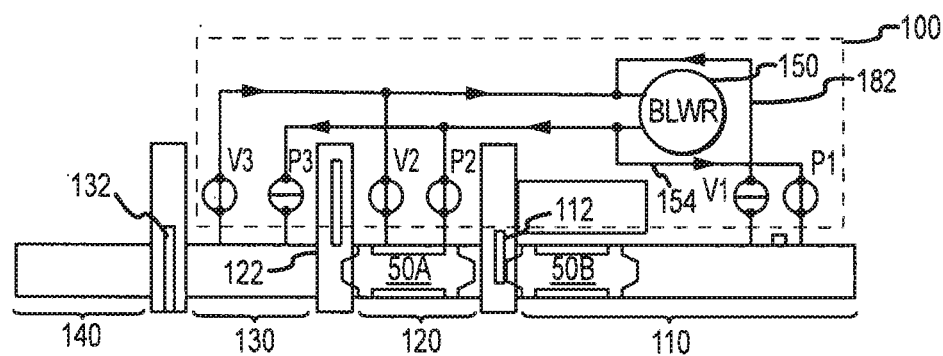

Once a carrier 50A is located within the staging zone 120, the gripper gate 112 may be moved to a lowered position as shown in FIG. 5C to prevent additional carriers 50B, 50C (not shown) from advancing into the staging zone 120. Accordingly, any additional carriers 50B that arrive are stopped and stored within the storage zone 110. In the embodiment shown, the storage zone 110 is sized to temporarily store two carriers. However, it will be appreciated that the length of the storage zone 110 may be increased to allow for additional storage therein.

The gripper gate 112 is operative to engage an end portion of a carrier 50B to prevent advancement of that carrier 50B. However, the gripper gate 112 does not pneumatically isolate the storage zone 110 and the staging zone 120. Accordingly, the storage zone 110 and staging zone 120 remain in fluid contact such that a pressure from the blower 150 of the air powered TCU 14 may be applied across the carriers 50A, 50B to bias these carriers forward. That is, by maintaining pressure valve P1 and return valve V2 open, a pneumatic circuit may be defined and a fluid flow may be maintained through this circuit (i.e., the P1-V2 circuit). This airflow biases carriers in the staging zone 120 against the entrance gate 122 (i.e., the output side of the staging zone 120) and biases carriers in the storage zone 110 against the gripper gate 112.

While the entrance gate 122 and/or gripper gate 112 may be utilized to effectively stop the carrier 50A within the TCU 14, initiating motion of such a stationary carrier has heretofore been problematic. Previously, a stationary carrier required system pressure from a system blower 22 (see FIG. 1) be utilized to reinitiate motion of a stationary carrier. However, wear bands of the pneumatic carriers are sized to provide a conformal fit with the inside surface of the pneumatic tubes within the system 10. Accordingly, these wear bands provide a significant static friction between a carrier and a pneumatic tube when the carrier is stationary. Furthermore, the system pressures utilized by pneumatic carrier systems are generally low (e.g., in the range of 3 to 5 psi). Accordingly, in cases where a stationary carrier contains a heavy load, the pressure differential available from the system pressure may not be enough to reinitiate movement of the stationary carrier. The air powered TCU 14 utilizes the independent pressure system to create increased pressure differentials across a carrier and thus reliably reestablish movement of stationary carriers.

Figure 5D:
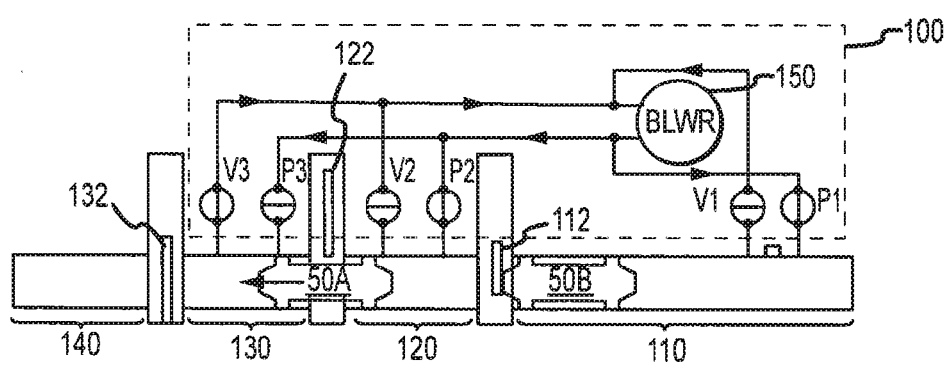

Movement of the carrier 50 from the staging zone 120 to the output zone 130 is illustrated in FIG. 5D. In order to move the carrier 50 within the staging zone 120 into the output zone 130, the entrance gate 122 is opened and airflow from the blower 150 is applied through the staging zone 120 to the output zone 130. As shown, return valve V3 is opened on the output end of the output zone 130 and pressure valve P2 is opened on the arrival end of the staging zone 120. This creates an airflow from the arrival end of staging zone 120 to the output end of output zone 130. Of note, it may be desirable to open pneumatic circuit P2-V3 prior to closing the previously opened pneumatic circuit P1-V2. This prevents the booster blower 150 from operating in a closed circuit that could result in over pressurizing one or more output lines 152, 154, 158, 162. Alternatively, valve P1 may be left open to continue biasing carrier 50B forward. Once the P2-V3 pneumatic circuit is open, a pressure differential is created across the carrier 50A to create a pushing force.

The booster blower 150 provides an airflow (i.e., boost pressure) that is operative to establish movement of a stationary carrier 50A and move the carrier 50A to the output zone 130. Further, the blower 150 may incorporate a variable frequency drive that allows for throttling its output. In this regard, if the carrier 50A does not move into the output zone 130 (i.e., remains stationary), the airflow output of the blower 150 may be increased until the carrier 50 is moved to the desired location.

Figure 5E:
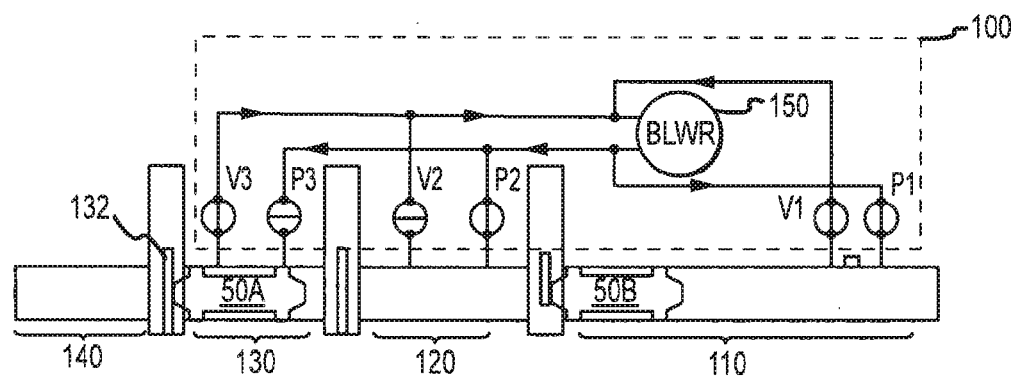

Once the carrier 50 is located within the output zone 130, entrance gate 122 is returned to the closed position, See FIG. 5E, which pneumatically isolates the staging zone 120 and the output zone 130. At this time, another carrier 50B within the storage zone 110 may be moved into the staging zone 120 by opening the gripper gate 112 and by pressurizing the P1-V2.

Figure 5F:
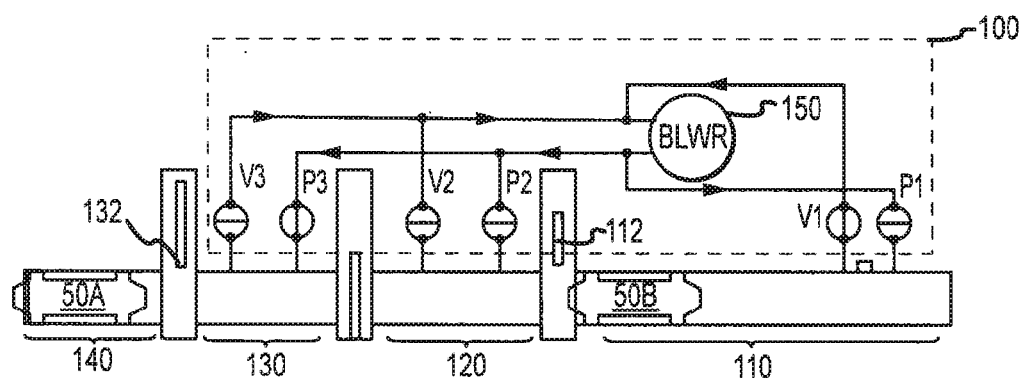

FIG. 5F illustrates moving the carrier 50A in the output zone 130 to the output tube 140 where it may be delivered to a subsequent location (e.g., pneumatic tube 102B) within the pneumatic system 10. In this regard, the exit gate 130 is moved to an open position and the P3 valve is opened such that the blower 150 may pressurize the arrival end of the output zone 130 to eject the carrier 50A from the TCU 14.

Once the carrier 50 is ejected from the output zone 130, the exit gate 132 is returned to its closed position, pressure valve P1 is reopened, and pressure valve P3 is closed. Accordingly, the system is then arranged in a manner similar to that of FIG. 5B and one or more of the above processes may be repeated As noted, the blower 150 of the air powered TCU 14 is operative to vary pressure across a pneumatic circuit as needed. Generally, the air powered TCU 14 will be operative to create a pressure differential of between about 0.5 psi to about 3 psi across a carrier within the air powered TCU 14.

This pressure differential multiplied by the cross-sectional area of the main tube 102 results in applying a significant moving force to a stationary carrier 50. For instance, for a 4 inch diameter tube, a 0.5 psi pressure differential would result in applying about 6 lbs. of force to a carrier and a 4.0 psi pressure differential would result in applying about 48 lbs. of force to a carrier. The magnitude of the pressure differential is a function of the size/capacity of the booster blower and/or the size of the input and output lines interconnecting the booster blower 150 to the system 10. As will be appreciated, further increased pressures are possible and within the scope of the present invention.

Figure 6:
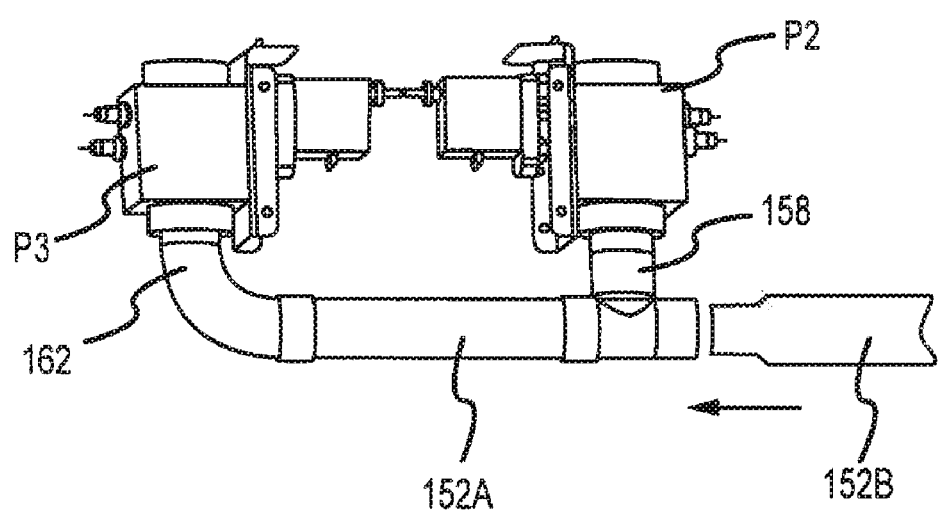
FIG. 6 illustrates ducting connecting components of the TCU of FIG. 5A.

Various characteristics of the boost blower system warrant further discussion. For instance, it may be preferable that each of the output/pressure lines 152, 154 158 and 162 as well as each of the input lines 170 172, 176 and 182 utilize a slip duct fitting arrangement. That is, it may be preferable that these lines are not fixedly interconnected but rather utilize a friction fit connection. See FIG. 6. For instance adjacent duct pieces 152A and 152B may include mating male and female ends. As will be appreciated, most pneumatic tube systems are located within ceilings and/or crawl spaces of various facilities. Accordingly, space is often limited when installing such systems. Likewise, servicing these systems is performed in the same limited spaces. Utilization a slip fit system for the ducting of the boost pressure system may facilitate maintenance of the system.

The foregoing description of the packaging design has been presented for purposes of illustration and description. Furthermore, the description is not intended to limit the invention to the form disclosed herein. Consequently, variations and modifications commensurate with the above teachings, and skill and knowledge of the relevant art, are within the scope of the invention. The embodiments described hereinabove are further intended to explain best modes known of practicing the invention and to enable others skilled in the art to utilize the invention in such, or other embodiments and with various modifications required by the particular application(s) or use(s) of the invention. It is intended that the appended claims be construed to include alternative embodiments to the extent permitted by the prior art.

What is claimed is:

1. A device for temporarily storing carriers within a pneumatic transport system, comprising:
    a pneumatic tube having an internal bore sized to permit passage of a pneumatic carrier;
    a first gate member, said first gate member being selectively positionable into and out of said internal bore of said pneumatic tube for stopping movement of a pneumatic carrier through said internal bore, wherein said first gate member permits fluid flow through said internal bore of said pneumatic tube when said first gate member is positioned into said internal bore of said pneumatic tube; and
    a blower, said blower having a first fluid inlet fluidly interconnected to said internal bore of said pneumatic tube on a first side of said first gate member and a first fluid outlet fluidly interconnected to said internal bore of said pneumatic tube on a second side of said first gate member.

2. The device of claim 1, wherein said blower is selectively operable to generate a fluid flow through said internal bore of said pneumatic tube between said first outlet and said first inlet.

3. The device of claim 2, wherein said blower is operable to selectively adjust a volume of said fluid flow.

4. The device of claim 1, further comprising:
    a second gate member spaced from said first gate member, said second gate member being selectively positionable into and out of said internal bore of said pneumatic tube.

5. The device of claim 4, wherein a spacing between said first gate and said second gate is sized to accommodate one pneumatic carrier therebetween.

6. The device of claim 5, wherein said blower further comprises at least one of:
    a second fluid inlet fluidly interconnected to said internal bore of said pneumatic tube on a first side of said second gate member and between said first and second gate members; and
    a second fluid outlet fluidly connected to said pneumatic tube on a second side of said second gate member.

7. The device of claim 4, wherein said second gate member prevents fluid flow through said internal bore of said pneumatic tube when said second gate member is positioned into said internal bore.

8. The device of claim 1, wherein a spacing between said first fluid outlet and said first gate is sized to receive at least two pneumatic carriers therebetween.

9. The device of claim 1, wherein said first fluid inlet and said first fluid outlet each further comprise:
    a selectively operable valve for opening and closing a fluid flow path to said blower.

10. The device of claim 9, wherein said fluid flow path between said blower and each said valve comprises ducting.

11. The device of claim 10, wherein said ducting utilizes slip fit joints to interconnect adjacent ducts, wherein said adjacent ducts are free of direct mechanical interconnection.

12. The device of claim 1, wherein a first end of said pneumatic tube is interconnectable to a transport tube in said pneumatic transport system, wherein said internal bore of said pneumatic tube and an internal bore of said transport tube are aligned.

13. The device of claim 1, wherein said blower is operable to increase a pressure differential across a carrier disposed between said first fluid outlet and said first fluid inlet.

14. The device of claim 13, wherein said blower is operative to increase said pressure differential between about 0.5 psi and about 4 psi.

15. The device of claim 1, wherein said first fluid inlet and said first fluid outlet extend through a sidewall of said pneumatic tube.

16. A device for temporarily storing carriers within a pneumatic transport system, comprising:
    a pneumatic tube having an internal bore sized to permit passage of a pneumatic carrier, an inlet for receiving a carrier from a pneumatic transport system and an outlet for discharging a carrier to the pneumatic transport system;
    a stopper selectively positionable into and out of said internal bore via linear movement of said pneumatic tube for engaging a pneumatic carrier to stop movement of a pneumatic carrier through said internal bore; and
    a blower having a fluid outlet extending through a sidewall of said pneumatic tube at a location upstream of said stopper, wherein said blower is selectively operable to inject a fluid flow into said internal bore at a location upstream of a stopped carrier to reinitiate movement of the stopped carrier.

17. The device of claim 16, wherein said blower further comprises:
- a fluid inlet extending through said sidewall of said pneumatic tube at a location downstream of said stopper, wherein said blower is operative to establish a fluid flow through said internal bore between said fluid outlet and said fluid inlet.

18. The device of claim 16, wherein a first end of said pneumatic tube is interconnected to a first component within the pneumatic transport system, wherein an internal bore of said first component is aligned with said internal bore of said pneumatic tube.

19. The device of claim 18, wherein a second end of said pneumatic tube is interconnected to a second component within the pneumatic transport system, wherein an internal bore of said second component is aligned with said internal bore of said pneumatic tube.

20. The device of claim 18, wherein said first component comprise one of:
- a pneumatic tube;
- a user station; and
- a transfer unit operative to move a pneumatic carrier between non-aligned pneumatic tubes.

21. A device for temporarily storing carriers within a pneumatic transport system, comprising:
- a pneumatic tube having an internal bore sized to permit passage of a pneumatic carrier;
- a first gate member, said first gate member being selectively positionable into and out of said internal bore of said pneumatic tube for stopping movement of a pneumatic carrier through said internal bore;
- a second gate member spaced from said first gate member, said second gate member being selectively positionable into and out of said internal bore of said pneumatic tube, wherein a spacing between said first gate and said second gate is sized to accommodate a pneumatic carrier therebetween; and
- a blower, said blower having a first fluid inlet fluidly interconnected to said internal bore of said pneumatic tube on a first side of said first gate member, a first fluid outlet fluidly interconnected to said internal bore of said pneumatic tube on a second side of said first gate member, and a second fluid outlet fluidly interconnected to said internal bore of said pneumatic tube between said first and second gate members.

22. The device of claim 21, wherein said blower is selectively operable to generate a fluid flow through said internal bore of said pneumatic tube between said first outlet and said first inlet.

23. The device of claim 21, wherein said blower is operable to selectively adjust a volume of said fluid flow.

24. The device of claim 21, wherein said second gate member prevents fluid flow through said internal bore of said pneumatic tube when said second gate member is positioned into said internal bore.

25. The device of claim 21, wherein said first fluid inlet and said fluid outlets each further comprise:
- a selectively operable valve for opening and closing a fluid flow path to said blower.

* * * * *